United States Patent
Liu

(10) Patent No.: US 8,758,007 B2
(45) Date of Patent: Jun. 24, 2014

(54) STRUCTURE OF SLIDE-BLOCK MODULE OF A PLASTIC PALLET SHAPING MOLD

(71) Applicant: Shin Tai Plastics Industrial Co., Ltd., Taipei (TW)

(72) Inventor: Cheng-Chia Liu, Taipei (TW)

(73) Assignee: Shin Tai Plastics Industrial Co., Ltd., Taipei (TW)

( * ) Notice: Subject to any disclaimer, the term of this patent is extended or adjusted under 35 U.S.C. 154(b) by 144 days.

(21) Appl. No.: 13/633,329

(22) Filed: Oct. 2, 2012

(65) Prior Publication Data
US 2013/0202731 A1  Aug. 8, 2013

(30) Foreign Application Priority Data

Feb. 8, 2012 (TW) .............................. 101202305 A
Feb. 8, 2012 (TW) .............................. 101202306 A

(51) Int. Cl.
*B29C 45/44* (2006.01)
(52) U.S. Cl.
USPC .................... 425/556; 425/577; 425/DIG. 58
(58) Field of Classification Search
CPC ........................... B29C 45/44; B29C 45/4421; B29C 45/4435; B65D 19/04; B65D 19/0006; B65D 19/18
USPC .......... 425/556, 577, 542, 441, 443, DIG. 58; 108/53.1, 51.11, 53.3, 901
See application file for complete search history.

(56) References Cited

U.S. PATENT DOCUMENTS

| 3,373,460 | A | * | 3/1968 | Ladney, Jr. ..................... 425/416 |
| 3,677,200 | A | * | 7/1972 | Coccagna et al. ........... 108/53.5 |
| 3,759,194 | A | * | 9/1973 | Fujii et al. .................. 108/57.28 |
| 3,795,206 | A | * | 3/1974 | Utz ............................. 108/57.28 |
| 4,130,264 | A | * | 12/1978 | Schroer .......................... 249/180 |
| 4,781,648 | A | * | 11/1988 | Garfinkel ....................... 446/321 |
| 5,403,179 | A | * | 4/1995 | Ramsey ........................ 425/577 |
| D458,659 | S | * | 6/2002 | Pullaro ........................ D21/791 |
| 6,416,316 | B1 | * | 7/2002 | Kidera et al. ................. 425/556 |
| 6,474,977 | B1 | * | 11/2002 | Wimmer ....................... 425/556 |
| 6,506,330 | B1 | * | 1/2003 | Schweigert et al. .......... 264/318 |
| 8,469,696 | B2 | * | 6/2013 | Navarra Pruna .............. 425/556 |
| 2002/0134284 | A1 | * | 9/2002 | Apps .......................... 108/57.25 |
| 2002/0197428 | A1 | * | 12/2002 | Evans et al. .................. 428/35.7 |
| 2006/0013991 | A1 | * | 1/2006 | Hoogland ..................... 428/119 |
| 2011/0017106 | A1 | * | 1/2011 | Muirhead .................. 108/57.27 |

* cited by examiner

*Primary Examiner* — Yogendra Gupta
*Assistant Examiner* — Emmanuel S Luk
(74) *Attorney, Agent, or Firm* — Bacon & Thomas, PLLC

(57) ABSTRACT

The structure of slide-block module includes a plurality of slide-block modules composing several reinforced areas, the slide-block modules are contained in a plastic pallet shaping mold, the plastic pallet is provided in a connecting zone between a central area of a bearing surface and a plurality of supporting columns at surrounding sides on the plastic pallet with the plurality of reinforced areas having ribs arranged transversely or longitudinally; each slide-block module includes a fixed block fixed on a shaping mold and having at least a lateral side beveled, and having a slide block, by obliquely sliding moving of the slide block on the fixed block, the slide block can be released along the lateral side of the fixed block from the mold smoothly after injection molding.

12 Claims, 10 Drawing Sheets

STRUCTURE OF SLIDE-BLOCK MODULE
OF A PLASTIC PALLET SHAPING MOLD

BACKGROUND OF THE INVENTION

1. Field of the Invention

The present invention relates to a manufacturing technique of a plastic pallet, and especially to the structure of every slide-block module on a plastic pallet shaping mold.

2. Description of the Prior Art

As shown in FIG. 1, a conventional pallet 1 is composed of a bearing surface 2, a supporting surface 3 and a plurality of supporting columns provided between the bearing surface 2 and the supporting surface 3;

the plurality of supporting columns include four corner supporting columns 4.1, four pallet-edge supporting columns 4.2 on the surrounding sides of the plastic pallet and a central supporting column 4.3, a plurality of lateral openings 5 are provided between the bearing surface 2 and the supporting surface 3 and are provided each between a corner supporting columns 4.1 and one of the pallet-edge supporting columns 4.2 both on the surrounding sides of the plastic pallet, and further a plurality of inner through holes are provided to be communicated with the lateral openings 5; by virtue of material decreasing by having the above mentioned openings and through holes, cost of manufacturing is reduced, a mechanical arm of a piling machine can be inserted into the openings for the actions of transporting and storing.

The above stated pallet 1 and bearing surface 2 are composed of a plurality of ribs which are arranged across one another in 90 degree crossing angles, and by virtue that the plurality of supporting columns are provided between the pallet 1 and the bearing surface 2, for the convenience of manufacturing, some areas transversely or longitudinally allocated between the central supporting column 4.3 and each four pallet-edge supporting column 4.2 of the plastic pallet normally are provided with ribs 6 arranged in a single direction (transverse or longitudinal); the structural parts of such ribs 6 arranged in a single direction are subjected to non uniform distribution of force borne, concentration of stresses and having problem of damage.

And more, the lateral openings 5 and the inner through holes provided among the plurality of supporting columns are uneasy to have their mold built for manufacturing, in view of this, a conventional technique with a publication number 589,271 has a longer slide block and a shorter slide block respectively inserted into the lateral sides of a pallet mold to make lateral openings and inner through holes; however, when the length of the above slide blocks gets increased, manufacturing of the pallet mold gets more difficult, thus the time of the stroke for extracting the mold and the cost of the mold are increased.

In view of the above stated, the inventor of the present invention provides a "structure of slide-block module on a plastic pallet shaping mold" based on his professional experience of years in studying and experiments in related fields for improving the structure of the ribs arranged in a single direction, for increasing the strength of the bearing surface to thereby reducing the cost of manufacturing the pallet mold, and more important, to shorten the stroke of mold extracting, thus an object of reducing the working hour can be achieved.

SUMMARY OF THE INVENTION

Therefore, the object of the present invention is to provide a structure of slide-block module on a plastic pallet shaping mold, the slide-block module is manufactured to change the rib structures arranged in a single direction to being an arrangement that forms checks having the ribs being arranged across one another transversely and longitudinally, it thus gets the advantages of shortening the stroke of mold extracting, lowering the cost and achieving easy manufacturing.

For achieving the object of the present invention, the abovementioned plastic pallet is provided with a plurality of inner through hole and a plurality of lateral openings between a bearing surface and a supporting surface, and a plurality of reinforced areas are provided in a connecting zone provided with ribs arranged transversely or longitudinally between the central area of the bearing surface and a plurality of pallet-edge supporting columns on each surrounding edges of the plastic pallet, the reinforced areas are composed of a plurality of slide-block modules provided at relatively opposite positions on the shaping mold, wherein: each slide-block module includes a fixed block and at least a slide block, the bottom of the fixed block is provided with a fixed portion fixed on the shaping mold, a beveled guiding portion is provided and extended upwards above the fixed portion, a vertically directing shaping area is provided between the guiding portion and the fixed portion; the slide block is provided with an obliquely extended sliding connecting portion being oblique in opposition to the guiding portion, so that the slide block can be provided slidably on the stated fixed block; the bottom of the slide block is located above the shaping area to obscure the shaping area from above, thereby the shaping area and the bottom of the slide block are formed between them a mold cavity for injection shaping of the reinforced areas, after injection shaping of the reinforced areas, by obliquely sliding moving of the slide block on a lateral side of the fixed block, the bottom of the slide block moves upwards far away from the shaping area, thereby when the pallet is released from the mold after manufacturing, the reinforced areas can be smoothly released from the mold too.

The followings further describe the mode of practicing of various elements of the mold:

In practicing, the shaping mold includes an upper mold, a lower mold (the molds are each in a shape of rectangle) and a plurality of lateral slide blocks for manufacturing lateral openings of the pallet, and a plurality of above mentioned slide-block modules. The slide-block modules are provided between the upper mold and the lower mold, and are allocated in connecting zones provided with ribs arranged transversely or longitudinally between the central area of the bearing surface of the pallet and the pallet-edge supporting columns on the surrounding edges of the plastic pallet, for injection shaping of the above stated inner through holes and the reinforced areas.

In practicing, the slide-block modules are arranged to be spaced from one another, the upper mold has a protruding block between every two slide-block modules, and the fixed block of each slide-block module is provided at its two lateral sides each with a guiding portion and a shaping area, the slide blocks mentioned above are two by number, they are provided respectively at the two lateral sides of the fixed block, an outer side of each slide block to obscure the shaping area from above is a plane parallel to one of the lateral sides of the protruding block, two such planes of two slide blocks each is lapped over one of the lateral sides of the protruding blocks of the upper mold.

In practicing, alternately, the slide-block modules are arranged without spacing from one another, and the other lateral side far away from the guiding portion of the fixed block of each slide-block module is a vertical surface, the outer side of the slide block as stated to obscure the shaping area from above is a surface parallel to the vertical surface, the former surface being parallel to is lapped over a vertical surface of a fixed block of another slide-block module.

In practicing of the slide block, the sliding connecting portion of the slide block is a wedge shape block, the above mentioned guiding portion is excavated thereon with a dovetail slot for placing the wedge shape block of the slide block; when it is desired to take out the pallet after injection shaping of the mold, the wedge shape block of the slide block is moved up obliquely by sliding along the dovetail slot to move the bottom of the slide block upwards far away from the shaping area, in order that the reinforced areas can be released from the mold smoothly.

As compared to the conventional techniques, the present invention has the reinforced areas of the pallet made to form a shape appeared having checks and arranged in a transverse-and-longitudinal mode to strengthen the structure of the bearing portion; and by having the arrangement of relatively sliding moving between the fixed blocks and the sliding moving of the slide blocks of the slide-block modules, the objects of lowering the cost and achieving easy of manufacturing and reducing the working hour can be achieved.

The present invention will be apparent by knowing the technical means and after reading the detailed description of the preferred embodiment thereof in reference to the accompanying drawings.

DETAILED DESCRIPTION OF THE PREFERRED EMBODIMENT

Figure 1:
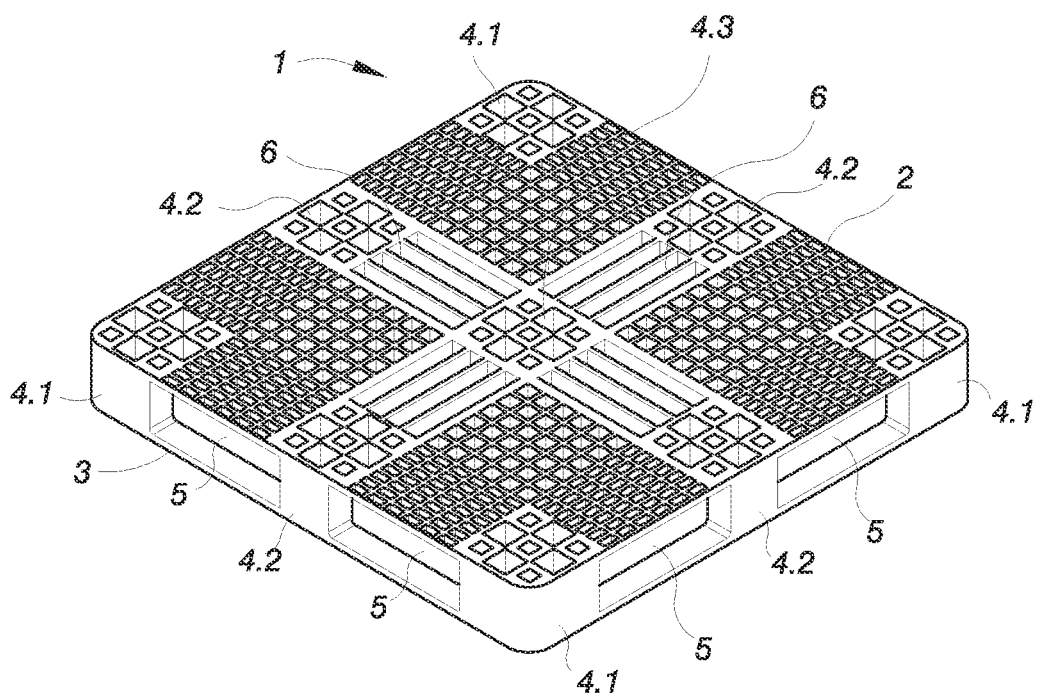
FIG. 1 is a perspective view showing the appearance of a conventional pallet.
Figure 2:
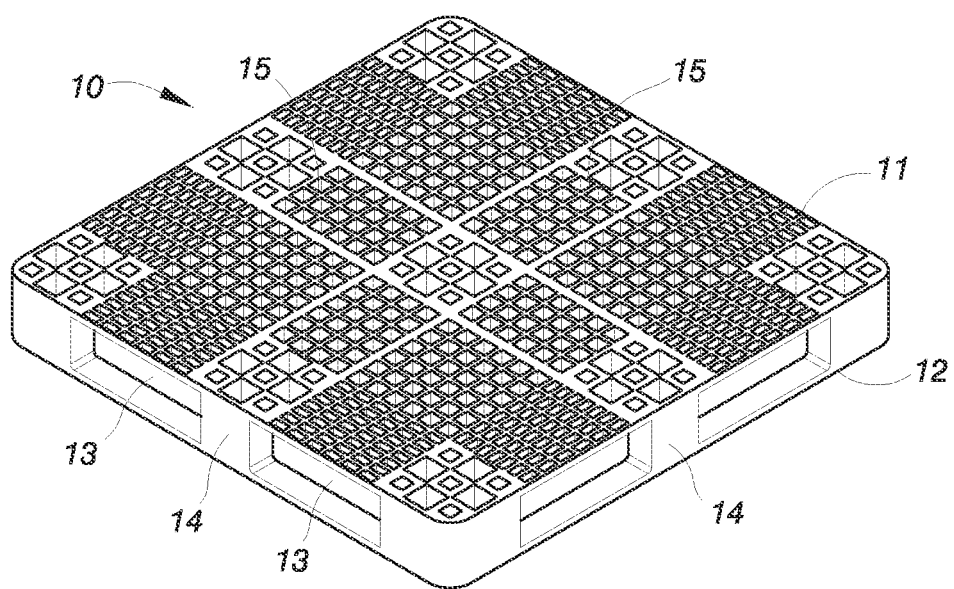
FIG. 2 is a perspective view showing the appearance of the plastic pallet made according to the present invention.
Figure 3:
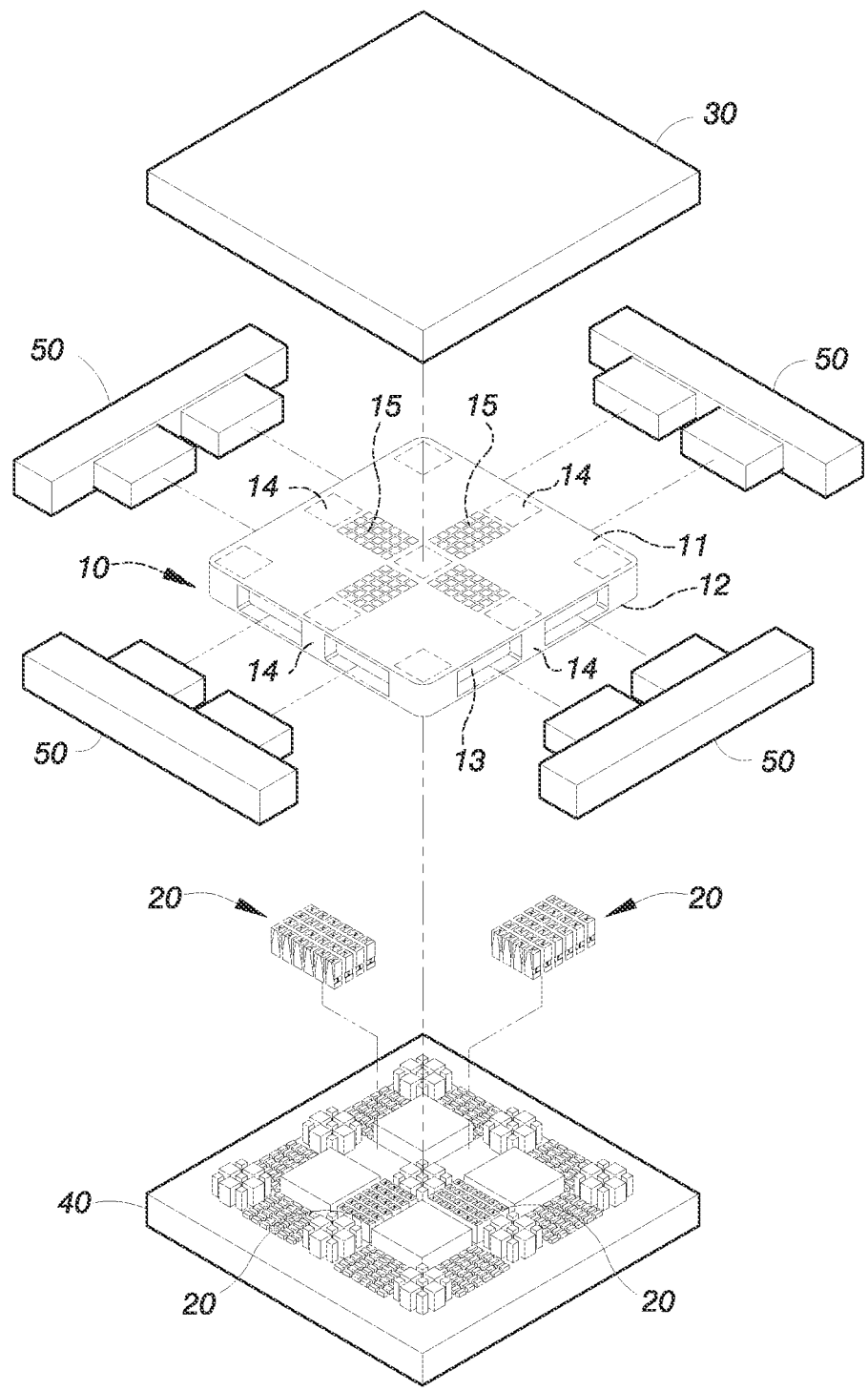
FIG. 3 is an anatomic schematic perspective view of a shaping mold of the present invention.
Figure 4:
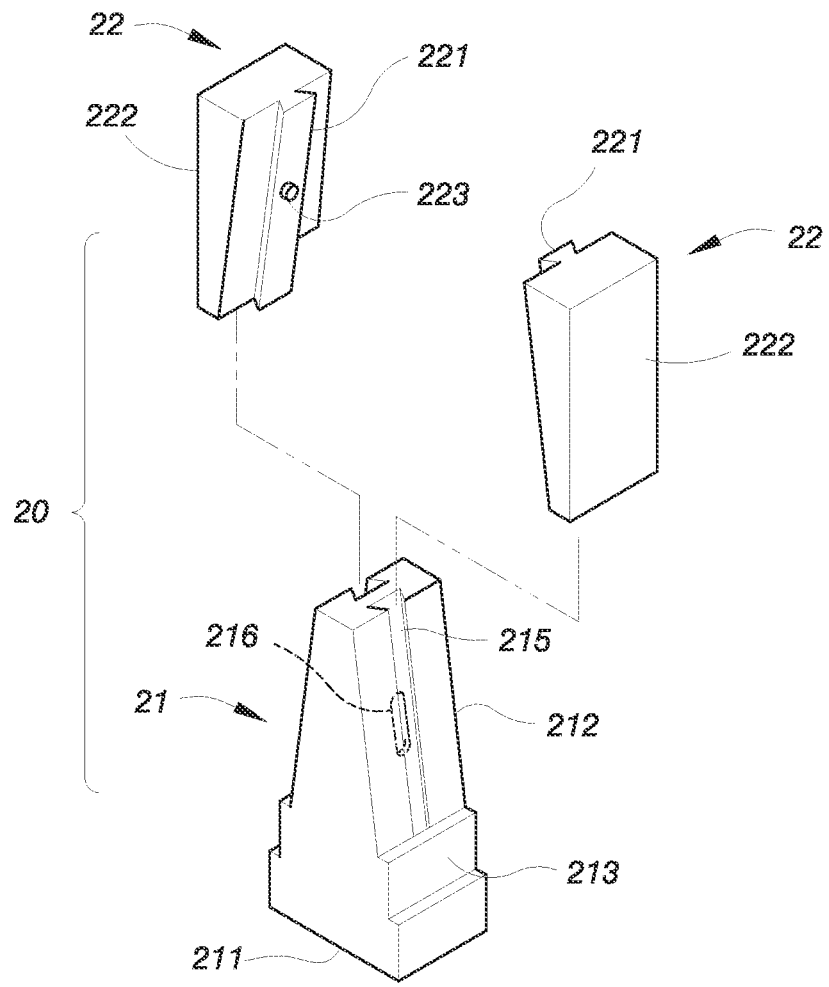
FIG. 4 is an anatomic schematic perspective view of the present invention.

Referring simultaneously to FIGS. 2 to 4, a plastic pallet 10 of the present invention is provided with a plurality of inner through holes and a plurality of lateral openings 13 between a bearing surface 11 and a supporting surface 12, and a plurality of reinforced areas 15 are provided in a connecting zone provided with ribs arranged transversely and longitudinally between the central area of the bearing surface 11 and a plurality of pallet-edge supporting columns 14 at the surrounding edges on the plastic pallet, the reinforced areas 15 are composed of a plurality of slide-block modules 20 provided at relatively opposite positions on the shaping mold, wherein:

each slide-block module 20 includes a fixed block 21 and at least a slide block 22, the bottom of the fixed block 21 is provided with a fixed portion 211 fixed on the shaping mold, a beveled guiding portion 212 is provided and extended upwards above the fixed portion 211, a vertically directing shaping area 213 is provided between the guiding portion 212 and the fixed portion 211; the slide block 22 is provided with an obliquely extended sliding connecting portion 221 being oblique in opposition to the guiding portion 212, so that the slide block 22 can be provided slidably on the stated fixed block 21; the bottom of the slide block 22 is located above the shaping area 213 to obscure the shaping area 213 from above, thereby the shaping area 213 and the bottom of the slide block 22 are formed between them a mold cavity for injection shaping of the reinforced areas 15, after injection shaping of the reinforced areas 15, by obliquely sliding moving of the slide block 22 on a lateral side of the fixed block 21, the bottom of the slide block 22 move upwards far away from the shaping area 213, thereby the reinforced areas 15 can be released from the mold smoothly.

In practicing, the shaping mold includes an upper mold 30, a lower mold 40 (the molds are each in a shape of rectangle) and a plurality of lateral slide blocks 50 for manufacturing lateral openings 13 of the pallet, and a plurality of above mentioned slide-block modules 20. The slide-block modules 20 are provided between the upper mold 30 and the lower mold 40, and are allocated in connecting zones provided with ribs arranged transversely or longitudinally between the central area of the bearing surface 11 of the pallet and the pallet-edge supporting columns 14 on the surrounding edges of the plastic pallet, for injection shaping of the above stated inner through holes and the reinforced areas 15.

Figure 5:
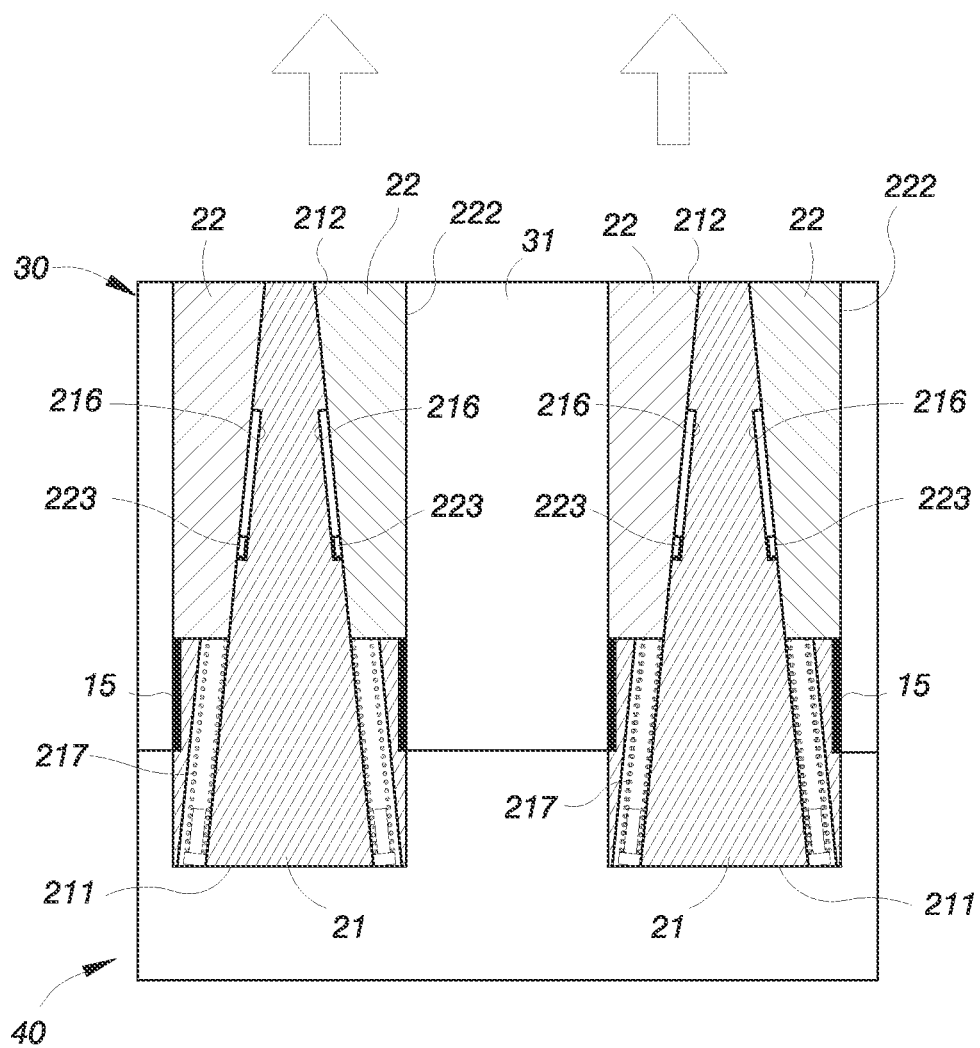
FIG. 5 is a schematic sectional view showing a plurality of slide blocks and fixed blocks are provided on a lower mold of the present invention.
Figure 6:
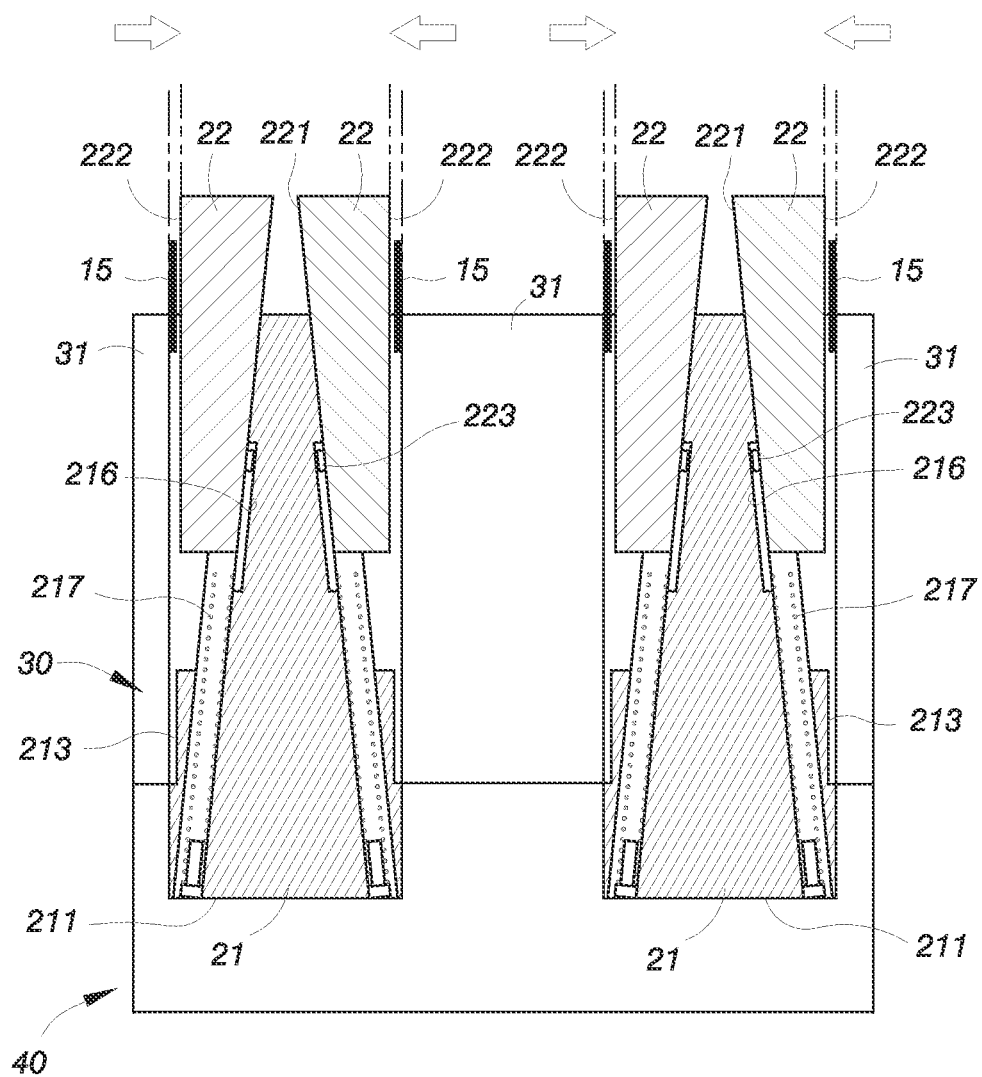
FIG. 6 is a schematic sectional view showing the slide blocks and the fixed blocks of the present invention are relatively moved.

Referring to FIGS. 5, 6, in practicing, the slide-block modules 20 are arranged to be spaced from one another, the upper mold 30 has a protruding block 31 between every two slide-block modules 20, and the fixed block 21 of each slide-block module 20 is provided at its two lateral sides each with a guiding portion 212 and a shaping area 213, the slide blocks 22 mentioned above are two by number, they are provided respectively at the two lateral sides of the fixed block 21, an outer side of each slide block 22 to obscure the shaping area 213 from above is a plane 222 parallel to the lateral side of the protruding block 31, two such planes 222 of two slide blocks 22 are respectively lapped over one of the lateral sides of the protruding blocks 31 of the upper mold 30.

When it is desired to extract the mold, the sliding connecting portion 221 of the slide block 22 is moved up obliquely along the guiding portion 212 of the fixed block 21 to move the bottom of the slide block 22 upwards far away from the shaping area 213, meantime, the planes 222 of the slide block 22 are retracted inwardly gradually to move away from the protruding block 31 the upper mold 30, so that the reinforced areas 15 can be released from the mold smoothly from where between the planes 222 of the slide block 22 and the protruding block 31 of the upper mold 30.

Figure 7:
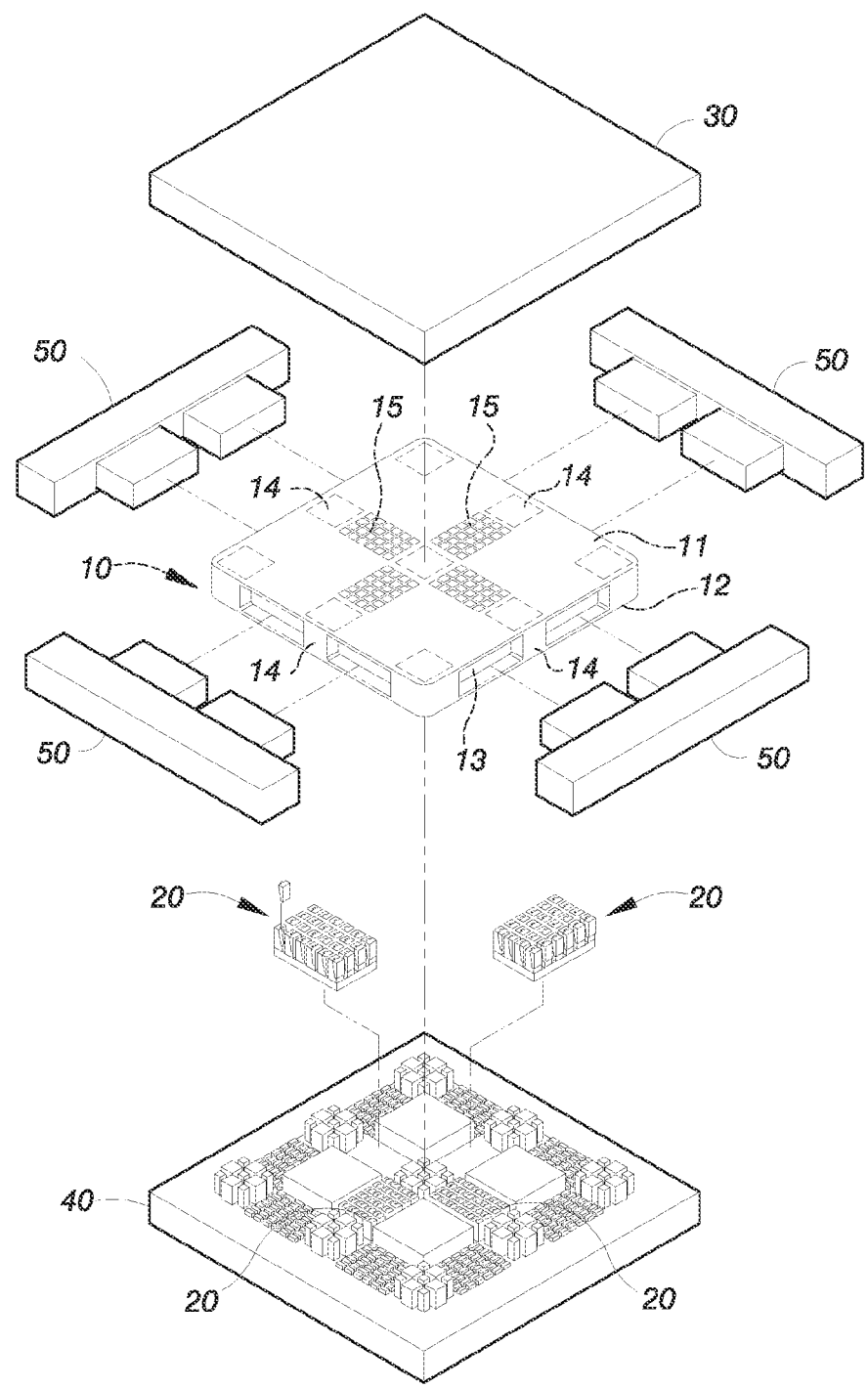
FIG. 7 is an anatomic schematic perspective view of a second embodiment of shaping mold of the present invention.
Figure 8:
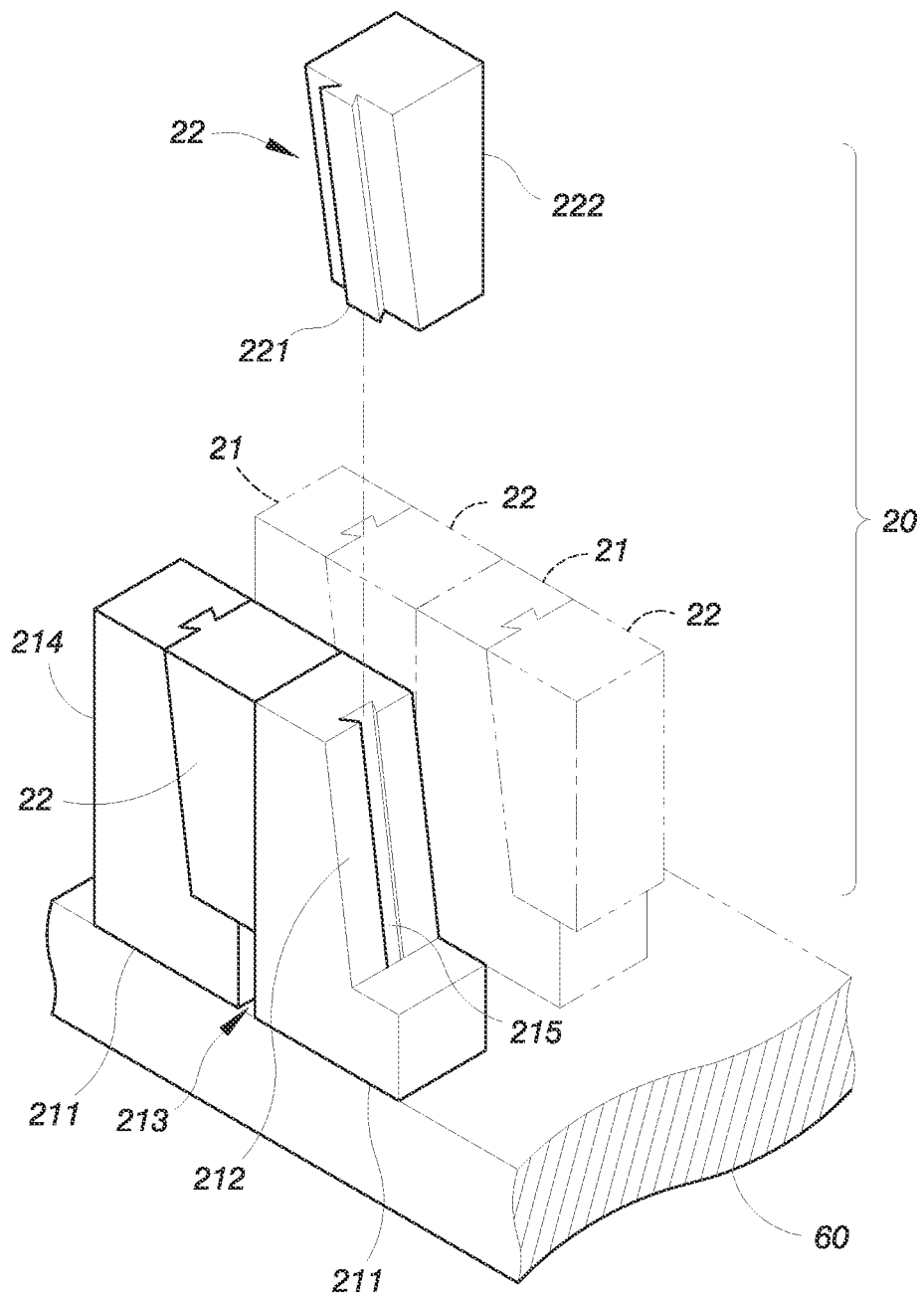
FIG. 8 is an anatomic schematic perspective view of the second embodiment of shaping mold of the present invention.

As shown in FIGS. 7, 8, in practicing, the slide-block modules 20 are arranged without spacing from one another, and the other lateral side far away from the guiding portion 212 of the fixed block 21 of each slide-block module 20 is a vertical surface 214, the outer side of each slide block 22 as stated to obscure the shaping area 213 from above is a surface 222 parallel to the vertical surface 214, the former surface 222 being parallel to is lapped over a vertical surface 214 of a fixed block 21 of another slide-block module 20.

Figure 9:
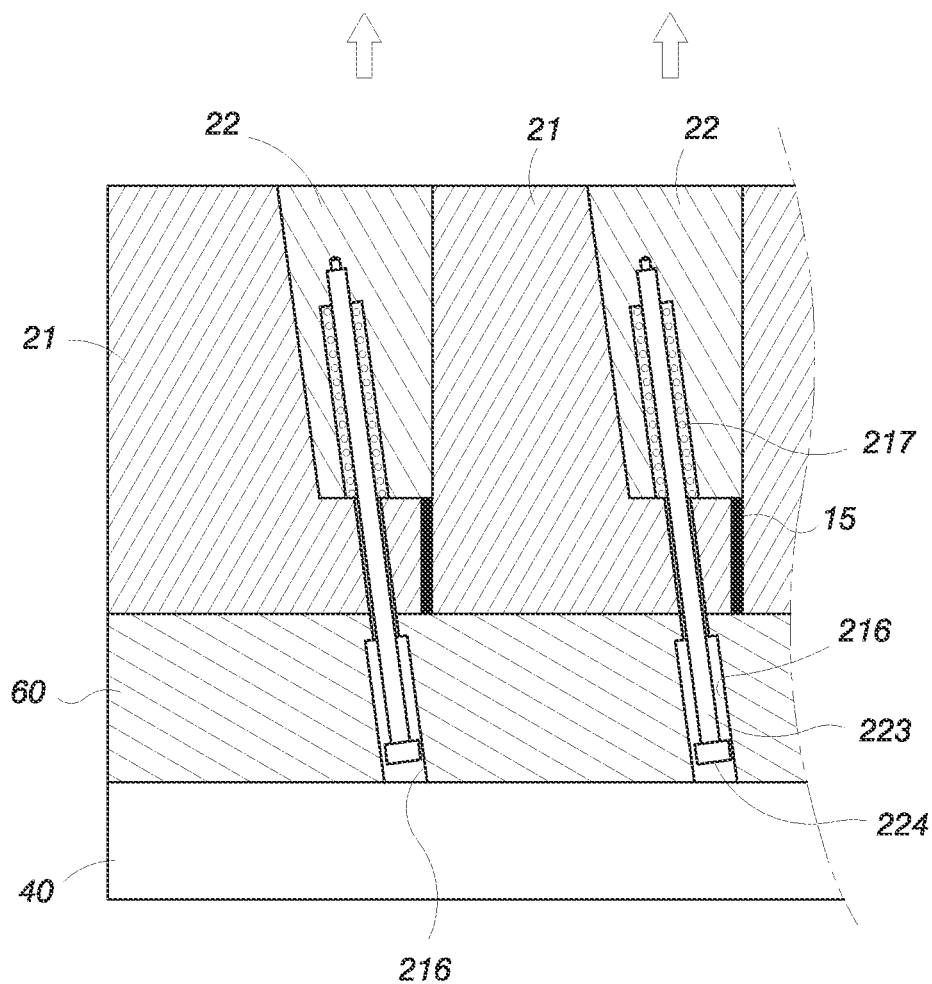
FIG. 9 is a schematic sectional side view of the second embodiment of shaping mold of the present invention.
Figure 10:
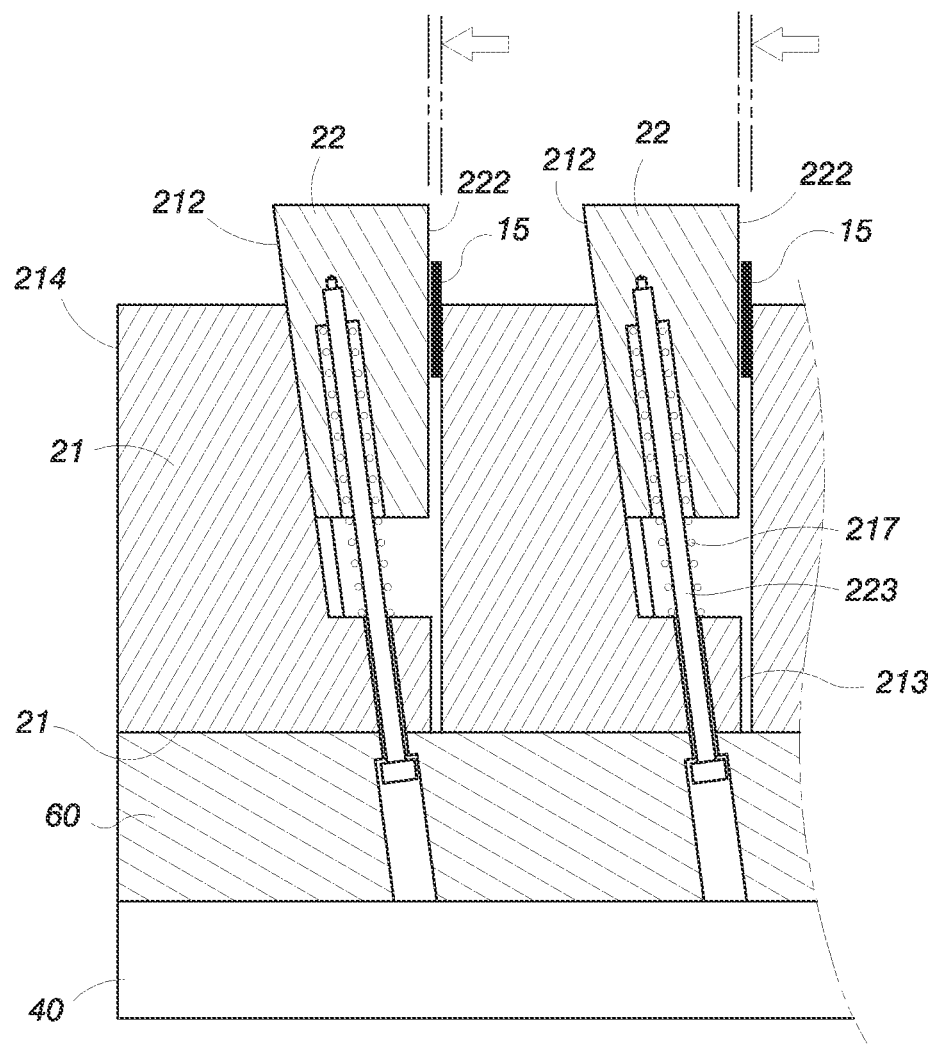
FIG. 10 is a schematic sectional view showing a plurality of slide blocks and fixed blocks are provided and relatively moved of the second embodiment of shaping mold of the present invention.

As shown in FIGS. 9, 10, When it is desired to extract the mold, the sliding connecting portion 221 of each slide block 22 is moved up obliquely along the guiding portion 212 of a fixed block 21 to move the bottom of the slide block 22 upwards far away from a shaping area 213, meantime, the planes 222 of the slide block 22 are retracted inwardly gradually to move away from the vertical surface 214 of the aforesaid another slide-block module 20, so that a reinforced area 15 can be released from the mold smoothly from where between the plane 222 of the slide block 22 and the vertical surface 214 of the aforesaid another slide-block module 20.

As shown in FIGS. 4, 8, in practicing of a slide block 22, the sliding connecting portion 221 of the slide block 22 is a wedge shape block, the above mentioned guiding portion 212 is excavated thereon with a dovetail slot 215 for placing the wedge shape block of the slide block 22; so that when it is desired to take out the pallet after injection shaping of the mold, the wedge shape block of the slide block 22 is moved up obliquely by sliding along the dovetail slot 215 to move the bottom of the slide block 22 upwards far away from the shaping area, in order that the reinforced areas 15 can be released from the mold smoothly.

Further as shown in FIGS. 4 to 6, in practicing of a fixed block 21, a dovetail slot 215 is provided on its inner wall with an obliquely upwardly directing position limiting recess 216, and each slide block 22 is provided thereon at where in opposition to a position limiting recess 216 with a position limiting rod 223 which extends into the position limiting recess 216, so that the position limiting rod 223 is limited to move only in the position limiting recess 216, hence an object of limiting the stroke of the slide block 22 from overly displacing upwards can be achieved, and the dovetail slot 215 of the fixed block 21 is further provided therein with an elastic element 217, in order that the elastic element 217 can constantly keep elastic force to hold up the slide block 22, thus the slide block 22 can create an adequate space after displacing to allow the reinforced area 15 to be released from the mold smoothly. In practicing, the elastic element 217 can be a spring.

Another embodiment that can help all the slide blocks 22 to be moved up obliquely is shown as in FIGS. 8 to 10, further, a bottom seat 60 is provided below a plurality of slide-block modules 20 which are arranged without spacing from one another, and is provided between the slide-block modules 20 and the shaping mold, the bottom seat 60 is provided therein with a plurality of position limiting recesses 216, and the slide-block modules 20 are provided therein each with a position limiting rod 223, the position limiting rod 223 has a stop portion 224 and is parallel to a sliding connecting portion 221; and the position limiting rod 223 has one end of it locked on a slide block 22, further has the other end of it extended through a fixed block 21, thus the stop portion 224 of the position limiting rod 223 is located in one of the position limiting recesses 216; when the slide block 22 is moved by sliding, it can bring the position limiting rod 223 and the stop portion 224 to displace, so that the position limiting rod 223 is moved in the fixed block 21 and is stopped when an end of the stop portion 224 abuts against an inner wall of the position limiting recess 216 of the bottom seat 60, hence the object of limiting the stroke of the slide block 22 from overly displacing upwards can be achieved.

And more, an elastic clement 217 is provided over the outer surface of each position limiting rod 223, the elastic element 217 is located between a slide block 22 and the fixed portion 211 of a fixed block 21, and constantly keeps elastic force to hold up the slide block 22, thus the slide block 22 can create an adequate space after displacing to allow a reinforced area 15 to be released from the mold smoothly. In practicing, the elastic element 217 can be a spring.

However, the embodiments described above and the drawings are only for illustrating a preferred embodiment of the present invention, and not for giving any limitation to the scope of the present invention. It will be apparent to those skilled in this art that various equivalent modifications in structure, installation and characteristic can be made to the elements of the present invention without departing from the spirit, scope of this invention. Accordingly, all such modifications also fall within the scope of the appended claims and are intended to form part of this invention.

The invention claimed is:

1. A structure of slide-block module of a plastic pallet shaping mold, said shaping mold is used for injection shaping a plastic pallet, a plurality of reinforced areas are provided in a connecting zone provided with ribs arranged transversely or longitudinally between a central area of a bearing surface of said plastic pallet and a plurality of pallet-edge supporting columns at surrounding edges on said plastic pallet, said reinforced areas each is composed of a plurality of slide-block modules provided at relatively opposite positions on said shaping mold, wherein:

each of said slide-block modules includes a fixed block and at least a slide block, a bottom of said fixed block is provided with a fixed portion fixed on said shaping mold, a beveled guiding portion is provided and extended upwards above said fixed portion, a vertically directing shaping area is provided between said guiding portion and said fixed portion; said slide block is provided with an obliquely extended sliding connecting portion being oblique in opposition to said guiding portion, so that said slide block is able to be provided slidably on said fixed block; a bottom of said slide block is located above said shaping area to obscure said shaping area from above, thereby said shaping area and said bottom of said slide block are formed between them a mold cavity for injection shaping of said reinforced area, after injection shaping of said reinforced area, by obliquely sliding moving of said slide block on a lateral side of said fixed block, said bottom of said slide block move upwards far away from said shaping area, thereby said reinforced area is able to be released from said shaping mold smoothly.

2. The structure of slide-block module of a plastic pallet shaping mold as stated in claim 1, wherein said shaping mold includes an upper mold and a lower mold each in a shape of rectangle, a plurality of lateral slide blocks for manufacturing lateral openings of said pallet; and said slide-block modules are contained in said shaping mold, said slide-block modules are provided between said upper mold and said lower mold, and are allocated in said connecting zones between said central area of said bearing surface of said pallet and said pallet-edge supporting columns at said surrounding edges on said plastic pallet.

3. The structure of slide-block module of a plastic pallet shaping mold as stated in claim 2, wherein said slide-block modules are arranged to be spaced from one another, said upper mold has a protruding block between every two of said slide-block modules, and said fixed block of each of said slide-block modules is provided at its two lateral sides each with a guiding portion and a shaping area, said slide blocks are two by number, said slide blocks are provided respectively at said two lateral sides of said fixed block, an outer side of each of said slide blocks to obscure said shaping area from above is a plane parallel to a lateral side of one of said protruding blocks, said two planes of said two slide blocks each is lapped over one of said lateral sides on one of said protruding blocks of said upper mold.

4. The structure of slide-block module of a plastic pallet shaping mold as stated in claim 3, wherein, said sliding connecting portion of said slide block is a wedge shape block, said guiding portion is excavated thereon with a dovetail slot for placing said wedge shape block of said slide block.

5. The structure of slide-block module of a plastic pallet shaping mold as stated in claim 4, wherein said dovetail slot is provided on its inner wall with an obliquely upwardly directing position limiting recess, and said slide block is provided thereon at where in opposition to said position limiting recess with a position limiting rod which extends into said position limiting recess, so that said position limiting rod is limited to be moved in said position limiting recess, hence stroke of displacing upwards of said slide block is limited.

6. The structure of slide-block module of a plastic pallet shaping mold as stated in claim 5, wherein and said dovetail slot of said fixed block is further provided therein with an elastic element in order that said elastic element constantly keeps elastic force to hold up said slide block.

7. The structure of slide-block module of a plastic pallet shaping mold as stated in claim 6, wherein said elastic element is a spring.

8. The structure of slide-block module of a plastic pallet shaping mold as stated in claim 2, wherein said slide-block modules are arranged without spacing from one another, and other lateral side far away from said guiding portion of said fixed block of each of said slide-block modules is a vertical surface, an outer side of said slide block to obscure said shaping area from above is a surface parallel to said vertical surface, said surface being parallel is lapped over a vertical surface of a fixed block of another of said slide-block modules.

9. The structure of slide-block module of a plastic pallet shaping mold as stated in claim 8, wherein said sliding connecting portion of said slide block is a wedge shape block, said guiding portion is excavated thereon with a dovetail slot for placing said wedge shape block of said slide block.

10. The structure of slide-block module of a plastic pallet shaping mold as stated in claim 8, wherein a bottom seat is provided below said slide-block modules which are arranged without spacing from one another and is provided between said slide-block modules and said shaping mold, said bottom seat is provided therein with a plurality of position limiting recesses; and said slide-block modules are provided therein each with a position limiting rod, said position limiting rods each has a stop portion and is parallel to a sliding connecting portion; and each of said position limiting rod has one end of it locked on one of said slide blocks, further has other end of it extended through one of said fixed blocks, thus each of said stop portions of said position limiting rods is located in one of said position limiting recesses; when each of said slide blocks is slide moved, it brings a corresponding one of said position limiting rods and a corresponding one of said stop portions to displace, so that said position limiting rod is moved in said fixed block and is stopped when an end of each of said stop portions abuts against an inner wall of a corresponding one of said position limiting recesses of said bottom seat, hence displacing of limiting stroke of said slide blocks from overly upwards is achieved.

11. The structure of slide-block module of a plastic pallet shaping mold as stated in claim 10, wherein an elastic element is provided over an outer surface of said position limiting rod, said elastic element is located between said slide block and said fixed portion of said fixed block.

12. The structure of slide-block module of a plastic pallet shaping mold as stated in claim 11, wherein said elastic element is a spring.

* * * * *